(12) United States Patent
Lee et al.

(10) Patent No.: US 9,647,528 B2
(45) Date of Patent: May 9, 2017

(54) SWITCH CONTROL CIRCUIT AND RESONANT CONVERTER INCLUDING THE SAME

(71) Applicant: FAIRCHILD KOREA SEMICONDUCTOR LTD., Bucheon-si (KR)

(72) Inventors: Won-Tae Lee, Cheonan-si (KR); Hyeong Seok Baek, Bucheon-si (KR); Ji-Hoon Jang, Incheon (KR); Hang-Seok Choi, Bedford, NH (US)

(73) Assignee: Fairchild Korea Semiconductor LTD (KR)

( * ) Notice: Subject to any disclaimer, the term of this patent is extended or adjusted under 35 U.S.C. 154(b) by 9 days.

(21) Appl. No.: 14/619,403

(22) Filed: Feb. 11, 2015

(65) Prior Publication Data

US 2015/0229220 A1  Aug. 13, 2015

Related U.S. Application Data

(60) Provisional application No. 61/938,443, filed on Feb. 11, 2014.

(30) Foreign Application Priority Data

Jan. 12, 2015  (KR) .................... 10-2015-0004389

(51) Int. Cl.
*H02M 3/335* (2006.01)
*H02M 1/32* (2007.01)
*H02M 1/00* (2006.01)

(52) U.S. Cl.
CPC ......... *H02M 1/32* (2013.01); *H02M 3/33507* (2013.01); *H02M 3/33538* (2013.01); *H02M 3/33569* (2013.01); *H02M 3/33592* (2013.01); *H02M 2001/0058* (2013.01); *Y02B 70/1433* (2013.01); *Y02B 70/1475* (2013.01); *Y02B 70/1491* (2013.01); *Y02P 80/112* (2015.11)

(58) Field of Classification Search
CPC ...................................................... H02M 1/32
USPC ..................................................... 363/21.03
See application file for complete search history.

(56) References Cited

U.S. PATENT DOCUMENTS

| 6,366,070 | B1 * | 4/2002 | Cooke ...................... G05F 1/56 323/284 |
| 8,624,572 | B2 | 1/2014 | Hosotani |
| 2003/0067794 | A1 | 4/2003 | Boylan et al. |

(Continued)

FOREIGN PATENT DOCUMENTS

| CN | 101677215 | 0/3201 |
| CN | 101728956 | 6/2010 |
| CN | 103138588 | 6/2013 |

*Primary Examiner* — Jue Zhang
*Assistant Examiner* — Trinh Dang
(74) *Attorney, Agent, or Firm* — Grossman Tucker Perreault & Pfleger PLLC

(57) ABSTRACT

A resonant converter includes a first switch coupled between a first node and a primary side ground, a second switch coupled between an input voltage and the first node, at least one capacitor and at least one inductor coupled in series between both ends of the first switch, and a switch control circuit that shifts switching frequencies of the first and second switches during a period for which an abnormal event lasts when occurrence of the abnormal event is detected, and shifts the switching frequencies in an opposite direction when the abnormal event ends.

21 Claims, 9 Drawing Sheets

(56) References Cited

U.S. PATENT DOCUMENTS

| | | |
|---|---|---|
| 2004/0105280 A1 | 6/2004 | Odaka |
| 2008/0055942 A1 | 3/2008 | Tao et al. |
| 2008/0186742 A1 | 8/2008 | Seong |
| 2009/0175056 A1 | 7/2009 | Choi |
| 2009/0196074 A1 | 8/2009 | Choi |
| 2009/0251925 A1 | 10/2009 | Usui et al. |
| 2010/0067262 A1 | 3/2010 | Chen et al. |
| 2010/0172157 A1 | 7/2010 | Chen et al. |
| 2011/0080757 A1 | 4/2011 | Young |
| 2011/0150521 A1 | 6/2011 | Uchiyama et al. |
| 2011/0211370 A1 | 9/2011 | Luo et al. |
| 2013/0336017 A1* | 12/2013 | Uno ................ H02M 3/33507 363/21.02 |
| 2015/0023062 A1 | 1/2015 | Hyugaji et al. |

* cited by examiner

SWITCH CONTROL CIRCUIT AND RESONANT CONVERTER INCLUDING THE SAME

CROSS-REFERENCE TO RELATED APPLICATION

This application claims priority to and the benefits of U.S. Patent Application No. 61/938,443 filed in the USPTO on Feb. 11, 2014, and Korean Patent Application No. 10-2015-0004389, filed with the Korean Intellectual Property Office on Jan. 12, 2015, the entire contents of which are incorporated herein by reference.

BACKGROUND (a) Technical Field

Embodiments relate to a switch control circuit and a resonant converter including the same.

(b) Description of the Related Art

It is preferable for a resonant converter to operate in an inductive region. When the resonant converter operates in a capacitive region, hard switching caused by non-zero voltage switching occurs. The resonant converter may be damaged due to heat generated by the hard switching. The hard switching may occur when a line voltage input to the resonant converter decreases or may occur in overload conditions.

SUMMARY

Embodiments provide a switch control circuit capable of preventing damage due to an operation in a capacitor region, and a resonant converter including the switch control circuit.

A resonant converter according to an embodiment includes: a first switch; a second switch coupled to the first switch; a capacitor and an inductor electrically coupled to a node to which the first switch and the second switch are coupled; and a switch control circuit that shifts switching frequencies of the first and second switches during a period for which an abnormal event lasts when an occurrence of the abnormal event is detected, and shifts the switching frequency in an opposite direction when the abnormal event ends.

The switch control circuit may control a switching operation of the first and second switches according to first and second clock signals, and increase frequencies of the first and second clock signals during the period for which the abnormal event lasts.

The switch control circuit may increase the frequencies of the first and second clock signals in each first period corresponding to at least one cycle of any one of the first clock signal and the second clock signal.

The abnormal event may include non-zero voltage switching and current limiting conditions, and the switch control circuit may perform control such that frequency increase units of the first and second clock signals are different in each first period according to each of the non-zero voltage switching and the current limiting conditions.

The switch control circuit may decrease the frequencies of the first and second clock signals from a time point at which the abnormal event ends.

The switch control circuit may decrease the frequencies of the first and second clock signals in each second period corresponding to at least one cycle of any one of the first clock signal and the second clock signal.

The switch control circuit may perform control so that frequency decrease units of the first and second clock signals are different in each second period according to each of the non-zero voltage switching and the current limiting conditions.

The switch control circuit may generate a comparison voltage corresponding to an output voltage of the resonant converter, decrease the comparison voltage in a predetermined period unit during the period for which the abnormal event lasts to generate an internal comparison voltage, and shift the switching frequencies of the first and second switches using the internal comparison voltage.

The switch control circuit may increase the internal comparison voltage in a predetermined period unit until the internal comparison voltage arrives at the comparison voltage from a time point at which the abnormal event ends.

The switch control circuit may generate first and second clock signals using a half cycle signal according to a result of comparing a saw wave based on a current detection voltage corresponding to a current supplied to a load with the internal comparison voltage, and control a switching operation of the first and second switches according to the first and second clock signals.

The switch control circuit may increase the internal comparison voltage in a predetermined period unit until the internal comparison voltage arrives at the comparison voltage from a time point at which the abnormal event ends.

The switch control circuit may shift the switching frequencies of the first and second switches during the period for which the abnormal event lasts in a predetermined monitoring period.

A switch control circuit according to an embodiment is applicable to a resonant converter that supplies power according to a switching operation of first and second switches. The switch control circuit includes: a frequency shift controller that generates a frequency shift signal for increasing frequencies of first and second clock signals during a period for which an abnormal event lasts, and generates a frequency shift signal for decreasing frequencies of the first and second clock signals when the abnormal event ends; and an LLC controller that increases the frequencies of the first and second clock signals according to the frequency shift signal during the period for which the abnormal event lasts, decreases the frequencies of the first and second clock signals according to the frequency shift signal after the abnormal event ends, and controls the switching operation of the first and second switches according to the first and second clock signals.

The frequency shift controller may generate a frequency shift signal for increasing the frequencies of the first and second clock signals in a shift unit according to a type of the abnormal event in each predetermined period during the period for which the abnormal event lasts.

The predetermined period may include at least one cycle of any one of the first and second clock signals.

The LLC controller may subtract a first period according to the frequency shift signal from a result of counting any one of the first and second clock signals in an immediately previous cycle during the period for which the abnormal event lasts, to set a current cycle of the first and second clock signals.

The LLC controller may count an enable period of any one of the first and second clock signals in the immediately previous cycle using a count clock signal, and calculate one cycle of the first and second clock signals based on the counted period.

The LLC controller may add a second period according to the frequency shift signal to a result of counting any one of the first and second clock signals in an immediately previous cycle from a time point at which the abnormal event ends, to set a current cycle of the first and second clock signals.

A switch control circuit according to still another embodiment is applicable to a resonant converter that supplies power according to a switching operation of first and second switches. The switch control circuit includes: a half cycle signal generator that generates a comparison voltage corresponding to an output voltage of the resonant converter, and generates a half cycle signal based on a result of comparing the comparison voltage with a saw wave based on a current detection voltage corresponding to a current supplied to a load; a frequency shift controller that decreases the comparison voltage in each first predetermined period during a period for which an abnormal event lasts to generate an internal comparison voltage, and increases the internal comparison voltage in each second predetermined period until the internal comparison voltage arrives at the comparison voltage when the abnormal event ends; and an LLC controller that generates first and second clock signals using the internal comparison voltage, and controls a switching operation of the first and second switches according to the first and second clock signals.

The frequency shift controller includes an error amplifier including a first input terminal to which the comparison voltage is input, and a second input terminal coupled to an output terminal; a resistor coupled to the output terminal of the error amplifier; and a current converter that generates a current based on a frequency digital shift signal for controlling a degree of decrease and increase in the comparison voltage, and the generated current flows from the output terminal of the error amplifier through the resistor; the comparison voltage decreases and the internal comparison voltage is generated.

The frequency shift controller includes a frequency shift multiplexer that outputs a shift unit for frequency increase as a frequency change amount in each first predetermined period during the period for which the abnormal event lasts, and outputs a shift unit for frequency decrease as the frequency change amount in each second predetermined period from a time point at which the abnormal event ends; a digital adder that adds the frequency change amount to the frequency digital shift signal to generate a frequency shift signal; and a frequency shift limiter that limits the frequency shift signal to be included in a predetermined range.

The frequency shift controller further includes a shift unit selector that selects the shift unit for frequency increase when the abnormal event occurs, and selects the shift unit for frequency decrease when the abnormal event ends.

Embodiments provide the switch control circuit capable of preventing damage due to an operation in a capacitor region, and the resonant converter including the switch control circuit.

DETAILED DESCRIPTION OF THE EMBODIMENTS

Figure 1:
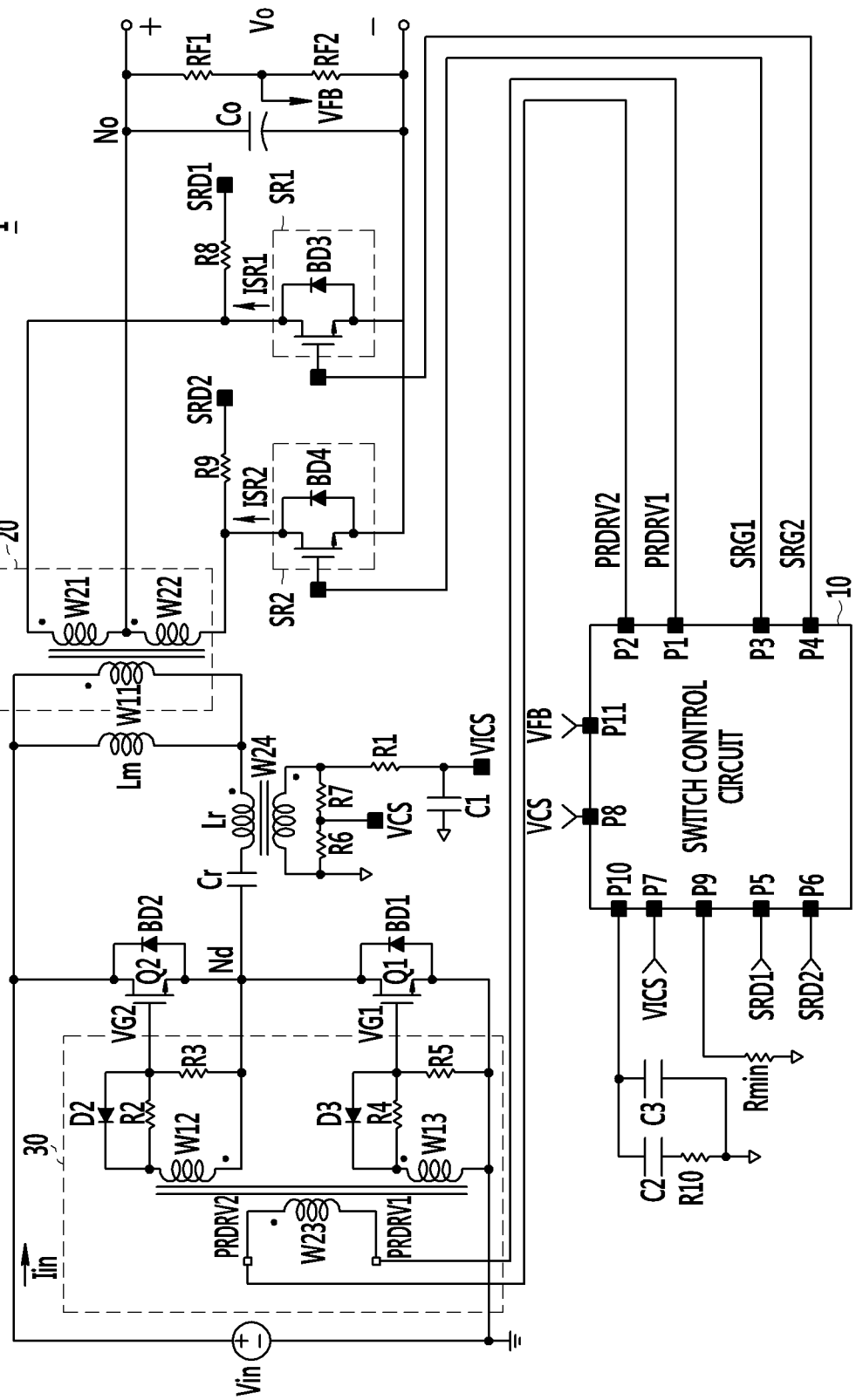
FIG. 1 is a diagram illustrating a resonant converter according to an embodiment.

Hereinafter, the prevent invention will be described in detail with reference to the accompanying drawings to be easily implemented by a person skilled in the art to which the invention belongs. However, the invention may be implemented in several different embodiments and is not limited to the embodiments to be described herein. Also, parts not related to the description will be omitted so as to clearly describe the invention in the drawings, and similar parts are denoted with similar reference signs throughout the detailed description.

Throughout the detailed description, it will be understood that when an element is referred to as being "connected" to another element, it can be "directly connected" to the other element or "electrically connected" to the other element while intervening elements may be present. In addition, it will be understood that when an element "includes" a component, it does not mean that other components are excluded, and other components may also be included unless specifically mentioned otherwise.

FIG. 1 is a diagram illustrating a resonant converter according to an embodiment.

The resonant converter illustrated in FIG. 1 is a half-bridge LLC resonant converter. Converters to which the invention can be applied are not limited thereto.

The resonant converter 1 includes a first switch Q1, a second switch Q2, a transformer 20, a gate driving circuit 30, a first synchronization rectification switch SR1, a second synchronization rectification switch SR2, and a switch control circuit 10.

Power supply of the resonant converter 1 is controlled based on a switching operation of the first switch Q1 and the second switch Q2. Body diodes BD1 and BD2 are formed between drains and sources of the first switch Q1 and the second switch Q2.

The second switch Q2 and the first switch Q1 are connected in series between an input voltage Vin and a primary side ground, and the second switch Q2 and the first switch Q1 alternately perform a switching operation. The second switch Q2 is turned OFF, and then the first switch Q1 is turned ON after a first dead time. The first switch Q1 is turned OFF, and then the second switch Q2 is turned ON after the first dead time.

The drain of the second switch Q2 is connected to the input voltage Vin, the source of the second switch Q2 and the drain of the first switch Q1 are connected to a node Nd, and the source of the first switch Q1 is connected to the primary side ground. Gate voltages VG1 and VG2 are supplied to gates of the second switch Q2 and the first switch Q1, respectively. The first switch Q1 and the second switch Q2 alternately perform switching, and the power supply is controlled based on the switching operation. For example, the power supply increases as the switching frequency of the first switch Q1 and the second switch Q2 decreases, and decreases as the switching frequency increases.

A capacitor Cr, a primary winding W1 of the transformer 20, and an inductor Lr are connected in series between the input voltage Vin and the node Nd. Resonance occurs between the capacitor Cr, the primary winding W1 and the inductor Lr, and a current Iin input to the primary side is controlled to be a sine wave by resonance.

On the secondary side of the transformer 20, a winding W21 and a winding W22 are coupled to the primary winding W11 in an insulated manner at a predetermined winding ratio. The first synchronization rectification switch SR1 is connected to one end of the secondary winding W21, and a body diode BD3 is formed between a drain and a source of the first synchronization rectification switch SR1. A second synchronization rectifying SR2 is connected to one end of the secondary winding W22, and a body diode BD4 is formed between a drain and a source of the second synchronization rectification switch SR2.

Hereinafter, a flow of a current through the first and second synchronization rectification switches SR1 and SR2 includes not only a flow of a current through the first and second synchronization rectification switches SR1 and SR2 that are turned on, but also a flow of a current through the body diodes BD3 and BD4.

The source of the first synchronization rectification switch SR1 is connected to the secondary side ground, the drain is connected to the one end of the secondary winding W21, and a first SR gate voltage SRG1 is input to a gate. The source of the second synchronization rectification switch SR2 is connected to the secondary side ground, the drain is connected to the one end of the secondary winding W22, and a second SR gate voltage SRG2 is input to a gate.

The other end of the secondary winding W21 and the other end of the winding W22 are connected to an output node No, and a capacitor Co is connected between the output node No and the secondary side ground. A voltage of the output node No is an output voltage Vo.

The body diode BD3 conducts a current flowing through the secondary winding W21 and the first synchronization rectification switch SR1 is turned ON. Accordingly, the current of the secondary winding W21 is rectified by the first synchronization rectification switch SR1 and flows through the capacitor Co. The current flowing through the first synchronization rectification switch SR1 is hereinafter referred to as a first synchronization rectification current ISR1.

The body diode BD4 conducts the current flowing through the secondary winding W22, and the second synchronization rectification switch SR2 is turned ON. Accordingly, the current of the secondary winding W22 is rectified through the second synchronization rectification switch SR2 and flows through the capacitor Co. The current flowing through the second synchronization rectification switch SR2 is hereinafter referred to as a second synchronization rectification current ISR2.

The first and second synchronization rectification currents ISR1 and ISR2 can be supplied to a load or used to charge the capacitor Co. A ripple of the output voltage Vo is attenuated by the capacitor Co.

The gate driving circuit 30 includes a secondary winding W23, two primary windings W12 and W13, four resistors R2 to R5, and two diodes D2 and D3.

A first driving voltage PRDRV1 is input to one end of the secondary winding W23, and a second driving voltage PRDRV2 is input to the other end of the secondary winding W23. The resistor R2 and the diode D2 are connected in parallel between one end of the primary winding W12 and the gate of the second switch Q2, and the other end of the primary winding W12 is connected to one end of the resistor R3 and a node Nd. The resistor R2, the resistor R3, and an anode of the diode D2 are connected to the gate of the second switch Q2. The resistor R4 and the diode D3 are connected in parallel between one end of the primary winding W13 and the gate of the first switch Q1, and the other end of the primary winding W13 is connected to one end of the resistor R5 and the primary side ground. The resistor R4, the resistor R5, and an anode of the diode D3 are connected to the gate of the first switch Q1.

The first switch Q1 performs the switching operation based on a gate voltage VG1, and the second switch Q2 performs a switching operation based on a gate voltage VG2. Since the first switch Q1 and the second switch Q2 are n channel transistors, an enable level of each of the gate voltage VG1 and the gate voltage VG2 is a high level, and a disable level is a low level.

If the first driving voltage PRDRV1 is at a high level and the second driving voltage PRDRV2 is at a low level, the current of the primary winding W12 flows through the resistor R3 and the diode D2, and the current of the primary winding W13 flows through the resistor R4 and the resistor R5. Accordingly, the gate voltage VG1 is formed as a voltage at a high level that can turn the first switch Q1 ON, and the first switch Q1 is turned ON while the gate voltage VG2 becomes a voltage lower than a source voltage of the second switch Q2 and the second switch Q2 is turned OFF.

If the second driving voltage PRDRV2 is at a high level and the first driving voltage PRDRV1 is at a low level, the current of the primary winding W12 flows through the resistor R2 and the resistor R3, and the current of the primary winding W13 flows through the resistor R5 and the diode D3. Then, the gate voltage VG2 is formed as a voltage at a high level that can turn the second switch Q2 ON, and the second switch Q2 is turned ON while the gate voltage VG1 becomes a voltage lower than the source voltage of the first switch Q1 and the first switch Q1 is turned OFF.

When the input current Iin flows through the inductor Lr, a current is induced in a secondary winding W24, and a detection voltage VCS is generated. For example, when the input current Iin flows toward the node Nd due to resonance, the current of the secondary winding W24 flows to the secondary side ground through the resistor R7 and the resistor R6. Accordingly, a positive detection voltage VCS corresponding to the input current Iin is generated. When the input current Iin flows from the node Nd due to the resonance, the current of the secondary winding W24 flows through the resistor R6 and the resistor R7 from the secondary side ground. Accordingly, a negative detection voltage VCS corresponding to the input current Iin is generated. The detection voltage VCS is supplied to the switch control circuit 10 through a pin P8, and the switch control circuit 10 can detect an overcurrent using the detection voltage VCS.

A resistor R1 is connected to one end of the secondary winding W24, the other end of the resistor R1 is connected to one end of a capacitor C1 and a pin P7, and the other end of the capacitor C1 is connected to the secondary side ground. A voltage corresponding to the current flowing through the secondary winding W24 is integrated by through an RC filter including the resistor R1 and the capacitor C1, and an integrating result is information corresponding to a current supplied to a load (hereinafter, a load current). The integrating result is a voltage for sensing the load and is also referred to as a current detection voltage VICS.

The switch control circuit 10 includes a pin P1 from which the first driving voltage PRDRV1 is output, a pin P2 from which the second driving voltage PRDRV2 is output, a pin P3 from which the first gate voltage SRG1 is output, a pin P4 from which the second gate voltage SRG2 is output, a pin P5 to which the first drain voltage SRD1 is input, a pin P6 to which the second drain voltage SRD2 is input, the pin P7 to which the current detection voltage VICS is input, a pin P8 to which the detection voltage VCS is input, a pin P9 to which a resistor Rmin for determining a lowest switching frequency is connected, a pin P10 to which a compensator is connected, and a pin P11 to which a feedback voltage VFB is input.

The pin P5 is connected to the drain of the first synchronization rectification switch SR1 through a resistor R8, and the pin P6 is connected to the drain of the second synchronization rectification switch SR2 through a resistor R9.

The compensator including a resistor R10, a capacitor C2, and a capacitor C3 is connected to the pin P10. The capacitor C3 is connected in parallel with the resistor R10 and the capacitor C2 that are connected in series, and one electrode of the capacitor C2 and one electrode of the capacitor C3 are connected to the pin P10. One end of the resistor R10 is connected to the other electrode of the capacitor C2, and the other end of the resistor R10 and the other electrode of the capacitor C3 are connected to the secondary side ground.

The pin P11 is connected to a node to which two resistors RF1 and RF2 are connected. The output voltage Vo is divided by the two resistors RF1 and RF2, and the feedback voltage VFB is generated.

The switch control circuit 10 amplifies a difference between the feedback voltage VFB and a predetermined reference voltage (VR; see FIG. 2) to generate an error voltage, and compensates for the error voltage to generate a comparison voltage COMP. The error voltage is compensated for by the compensator connected to the pin P10. The switch control circuit 10 generates first and second clock signals CLK1 and CLK2 (see FIG. 2) for controlling the respective switching frequencies of the first and second switches Q1 and Q2.

For example, the switch control circuit 10 turns the first switch Q1 ON at a time point delayed by the dead time from a rising edge of the first clock signal CLK1, and turns the first switch Q1 OFF at a falling edge of the first clock signal CLK1. The switch control circuit 10 turns the second switch Q2 ON at a time point delayed by the dead time from a rising edge of the second clock signal CLK1 and turns the second switch Q2 OFF at a falling edge of the second clock signal CLK2. The first clock signal CLK1 and the second clock signal CLK2 have opposite phases.

When the switch control circuit 10 detects occurrence of an abnormal event such as non-zero voltage switching and current limiting conditions, the switch control circuit 10 shifts the switching frequency during a predetermined monitoring period to reduce an ON time of the first and second switches Q1 and Q2.

When the resonant converter 1 operates in a capacitive region, the non-zero voltage switching and current limiting conditions occur. The resonant converter 1 operates in the capacitive region due to load conditions and line voltage conditions. For example, when the line voltage decreases or an overload is generated, the resonant converter 1 operates in the capacitive region. The non-zero voltage switching and current limiting conditions are examples of the abnormal event occurring due to the operation in the capacitive region.

The switch control circuit 10 increases the frequencies of the first and second clock signals CLK1 and CLK2 during a period for which the abnormal event lasts in a monitoring period. In this case, a degree of increase in the frequency over time can be controlled to be different depending on a type of abnormal event or can be controlled to be different over time.

That is, the switch control circuit 10 controls the switching operation of the first and second switches Q1 and Q2 based on the first and second clock signals CLK1 and CLK2, and increases the frequencies of the first and second clock signals CLK1 and CLK2 in a predetermined unit at least in each cycle of the first clock signal CLK1 (or the second clock signal CLK2) so that the resonant converter 1 can be out of the capacitive region when the abnormal event is detected. However, when the abnormal event lasts until the monitoring period lapses, the switch control circuit 10 starts up a protection operation and disables the switching operation of the first and second switches Q1 and Q2.

When the switch control circuit 10 detects an end of the abnormal event, the switch control circuit 10 can decrease the frequencies of the first and second clock signals CLK1 and CLK2 in a predetermined unit at least in each cycle of the first clock signal CLK1 (or the second clock signal CLK2). In this case, the switch control circuit 10 can decrease the frequencies of the first and second clock signals CLK1 and CLK2 in a unit smaller than the unit when increasing the frequencies.

In addition, the switch control circuit 10 turns the first synchronization rectification switch SR1 ON in synchronization with turn-ON of the first switch Q1, and turns the second synchronization rectification switch SR2 ON in synchronization with turn-ON of the second switch Q2. The switch control circuit 10 maintains the first and second synchronization rectification switches SR1 and SR2 in an ON state during a predetermined ON time, and then turns the first and second synchronization rectification switches SR1 and SR2 OFF.

For example, the switch control circuit 10 can subtract a predetermined margin from a conduction period in an immediately previous switching cycle of each of the first and second synchronization rectification switches SR1 and SR2 to determine the ON time of each of the first and second synchronization rectification switches SR1 and SR2 in a current cycle. The conduction period in the immediately previous switching cycle of each of the first and second synchronization rectification switches SR1 and SR2 is a period from a time point at which the body diodes BD3 and BD4 respectively connected to the first and second synchronization rectification switches SR1 and SR2 conduct to a blocking time point. In this case, the predetermined margin may be the dead time of the first and second synchronization rectification switches SR1 and SR2.

Hereinafter, the switch control circuit according to an embodiment will be described with reference to FIG. 2.

Figure 2:
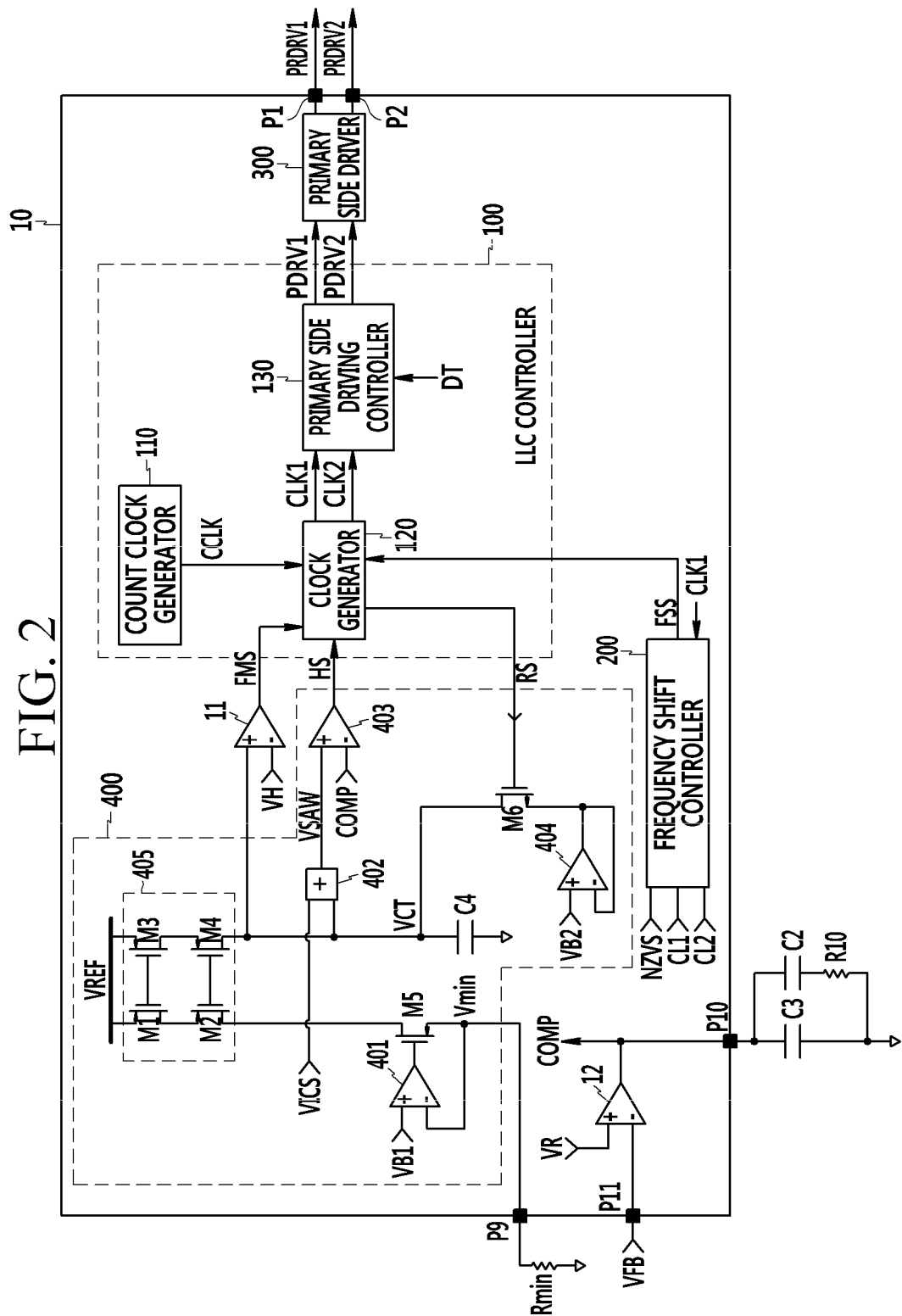
FIG. 2 is a diagram illustrating a switch control circuit according to the embodiment.

FIG. 2 is a diagram illustrating the switch control circuit according to the embodiment.

A configuration for controlling the primary side switches of the switch control circuit 10 is illustrated in FIG. 2. A specific configuration for controlling the secondary side synchronization rectification switches can be appropriately designed to implement the above-described control scheme or other schemes.

A configuration that generates clock signals during a monitoring period when an abnormal event occurs will be described in detail with reference to FIG. 2.

For example, the switch control circuit 10 includes an LCC controller 100, a frequency shift controller 200, a primary side driver 300, a half cycle signal generator 400, an upper limit comparator 11, and an error amplifier 12.

The frequency shift controller 200 generates a frequency shift signal FSS for increasing the frequencies of the first and second clock signals CLK1 and CLK2 when the abnormal event is detected, and generates a frequency shift signal FSS for decreasing the frequencies of the first and second clock signals CLK1 and CLK2 when the abnormal event ends. The frequency shift signal FSS can be sent to a clock generator 120 of an LLC controller 100.

The switch control circuit 10 can detect non-zero voltage switching using the detection voltage VCS and can detect the current limiting conditions using the current detection voltage VICS. For example, the switch control circuit 10 can detect the non-zero voltage switching based on a result of comparing the detection voltage VCS with a predetermined reference voltage at a time point of turn-ON of the first switch Q1, and can detect the current limiting conditions based on a result of comparing the current detection voltage VICS with a predetermined reference voltage. Specific means can be implemented using various schemes.

The switch control circuit 10 generates a non-zero voltage switching signal NZVS when the switch control circuit 10 detects the non-zero voltage switching, and can generate current limiting signals CL1 and CL2 according to the detected current limiting conditions when the switch control circuit 10 detects the current limiting conditions. For example, when the current detection voltage VICS is equal to or greater than a first reference voltage, CL1 may be generated, and when the current detection voltage VICS is more than a second reference voltage greater than the first reference voltage, CL2 may be generated.

The LLC controller 100 determines the frequencies of the first and second clock signals CLK1 and CLK2 according to the half cycle signal HS to generate the first and second clock signals CLK1 and CLK2 in a normal state, increases the frequencies of the first and second clock signals CLK1 and CLK2 during the period for which the abnormal event lasts, and decreases the frequencies of the first and second clock signals CLK1 and CKLK2 when the abnormal event ends. A detailed configuration and operation of the LLC controller 100 will be described below. An amount of a change in the frequencies can be determined based on the frequency shift signal FSS sent from the frequency shift controller 200.

The frequency shift controller 200 sets an amount of frequency shift according to each of NZVS, CL1, and CL2. The frequency shift controller 200 sets the amount of frequency shift over time during a predetermined monitoring period from a time point at which the abnormal event occurs.

For example, the frequency shift controller 200 can generate the frequency shift signal FSS for performing control so that the frequency of the first clock signal CLK1 is increased by a first predetermined shift unit in each cycle of the first clock signal CLK1 from a time point at which the non-zero voltage switching signal NZVS is generated. The first shift unit is variable over time.

Similarly, the frequency shift controller 200 can generate the frequency shift signal FSS for performing control so that the frequency of the first clock signal CLK1 is increased by a second or third predetermined shift unit in each cycle of the first clock signal CLK1 from a time point at which one of the current limiting signals CL1 and CL2 is generated. The second or third shift unit is also variable over time.

The frequency shift controller 200 continues the frequency shift control operation as described above during the period for which the abnormal event lasts in the monitoring period.

When the abnormal event ends, the non-zero voltage switching signal NZVS, and the current limiting signals CL1 and CL2 are disabled. Accordingly, the frequency shift controller 200 generates the frequency shift signal FSS for performing control so that the frequency of the first clock signal CLK1 is decreased by a predetermined shift unit in each cycle of the first clock signal CLK1 from an end time point. In this case, the shift unit can also be set to be different according to the type of the abnormal event and the time lapse.

While a case in which the frequency shift controller 200 operates in a unit of one cycle of the first clock signal CLK1 in synchronization with the first clock signal CLK1 has been described, the invention is not limited thereto. The frequency shift can be performed in each cycle of the second clock signal CLK2 rather than the first clock signal CLK1, or may be performed at least in every two cycles of any one of the first and second clock signals CLK1 and CLK2.

The half cycle signal generator 400 generates the saw wave VSAW, and generates the half cycle signal HS based on a result of comparing the saw wave VSAW with a comparison voltage COMP. The voltage VCT and the current detection voltage VICS may begin to increase in synchronization with a time point of increase in the first clock signal CLK1, and the first clock signal CLK1 may decrease at a time point at which the half cycle signal HS is generated. Then, the first clock signal CLK1 and the saw wave VSAW may be signals synchronized with each other and having the same frequency.

In the normal state, the frequencies of the first and second clock signals CLK1 and CLK2 are determined according to the half cycle signal HS. However, when the abnormal event occurs, the first and second clock signals CLK1 and CLK2 are controlled so that the frequency in a current cycle is higher than a frequency in an immediately previous cycle by any one of the first to third shift units. In addition, when the abnormal event ends, the first and second clock signals CLK1 and CLK2 are controlled so that the frequency in the current cycle is lower than the frequency in the immediately previous cycle by the shift unit.

When the ON time of the first switch Q1 increases according to the decreasing frequencies of the first and second clock signals CLK1 and CLK2 and the half cycle signal HS begins to be generated, the frequencies of the first and second clock signals CLK1 and CLK2 can be controlled based on the half cycle signal HS.

The half cycle signal generator 400 includes a current mirror circuit 405, two error amplifiers 401 and 404, an adder 402, a comparator 403, a transistor M5, and a capacitor C4, as illustrated in FIG. 2.

The error amplifier 401 and the transistor M5 operate as a voltage-current converter. An output terminal of the error amplifier 401 is connected to a gate of the transistor M5, an inversion terminal (−) of the error amplifier 401 is connected to a source of the transistor M5, and a voltage VB1 is input to a non-inversion terminal (+).

A current flows through the transistor M5 so that a minimum voltage Vmin input to the inversion terminal (−)

of the error amplifier 401 becomes equal to the voltage VB1 input to the non-inversion terminal (+). Since the minimum voltage Vmin is determined based on the resistor Rmin and the current flowing through the transistor M5, the current flowing through the transistor M5 may vary depending on the resistor Rmin.

The current mirror circuit 405 includes four transistors M1 to M4. A drain and a gate of each of the transistor M1 and the transistor M2 are connected. The transistor M1 and the transistor M2 operate like a diode. The transistor M1 and the transistor M2 are connected in series, and the transistor M3 and the transistor M4 are connected in series. A source of the transistor M1 and a source of the transistor M3 are connected to a voltage VREF, and a drain of the transistor M2 is connected to a drain of the transistor M5. A drain of the transistor M4 is connected to one electrode of the capacitor C4.

The current flowing through the transistor M5 is copied by the current mirror circuit 405 and supplied to the capacitor C4. Then, the capacitor C4 is charged, and the voltage VCT increases.

The voltage VB2 is input to the non-inversion terminal (+) of the error amplifier 404, and the inversion terminal (−) is connected to the source of the transistor M6 together with the output terminal. A reset signal RS is supplied to the gate of the transistor M6, and the one electrode of the capacitor C4 is connected to the drain. The inversion terminal (−) of the error amplifier 404 is connected to the output terminal, and the voltage VB2 becomes the output of the error amplifier 404.

The reset signal RS is generated in synchronization with any one of the first and second clock signals CLK1 and CLK2. The voltage VCT is maintained at a predetermined level during the enable period of the reset signal RS, and is increased at a constant slope during a disable period of the reset signal RS.

For example, the reset signal RS is disabled in synchronization with a rising time point of the first clock signal CLK1, and enabled in synchronization with a rising time point of the second clock signal CLK2. The voltage VCT is controlled to be equal to the voltage VB2 during a period in which the transistor M6 is turned ON, and during a period in which the transistor M6 is turned OFF, the capacitor C4 is charged with a current supplied from the current mirror circuit 405; the voltage VCT rises in a constant slope.

The adder 402 adds the voltage VCT to the current detection voltage VICS to generate the saw wave VSAW.

The comparator 403 generates the half cycle signal HS based on a result of comparing the saw wave VSAW with the comparison voltage COMP. The comparison voltage COMP is input to an inversion terminal (−) of the comparator 403, and the saw wave VSAW is input to a non-inversion terminal (+). The comparison voltage COMP can be a voltage generated by amplifying a difference between the voltage corresponding to the output voltage Vo and a predetermined reference voltage using a predetermined gain. When the saw wave VSAW rises and arrives at the comparison voltage COMP, the comparator 403 generates the half cycle signal HS at a high level.

The upper limit comparator 11 outputs a result of comparing the voltage VCT with a predetermined threshold voltage VH. Lowest frequencies of the first and second clock signals CLK1 and CLK2 can be determined based on an output signal FMS of the upper limit comparator 11. For example, the lowest frequencies of the first and second clock signals CLK1 and CLK2 are determined based on a period in which the voltage VCT arrives at the threshold voltage VH, and a lowest operation frequency of the resonant converter 1 is determined.

The error amplifier 12 amplifies a difference between the reference voltage VR and the feedback voltage VFB to generate an error voltage. The error voltage is compensated for by the compensator connected to the pin 10, and the comparison voltage COMP is generated.

The LLC controller 100 includes a count clock generator 110, a clock generator 120, and a primary side driving controller 130.

The count clock generator 110 generates a count clock signal CCLK for counting cycles of one of the first and second clock signals CLK1 and CLK2.

The clock generator 120 generates the first and second clock signals CLK1 and CLK2 based on the half cycle signal HS in a normal state, increases the frequencies of the first and second clock signals CLK1 and CLK2 when an abnormal event occurs, and decreases the frequencies of the first and second clock signals CLK1 and CLK2 when the abnormal event ends.

When the abnormal event continues during a predetermined monitoring period, the switch control circuit 10 starts up a protection operation. When the abnormal event does not end by a time point at which the monitoring period lapses, the generation of the first and second clock signals CLK1 and CLK2 can be stopped due to the start-up of the protection operation.

The clock generator 120 determines cycles of the first and second clock signals CLK1 and CLK2 according to the half cycle signal HS in the normal state. For example, the clock generator 120 decreases the first clock signal CLK1 to a low level at a time point at which the half cycle signal HS is generated, and determines the cycles of the first and second clock signals CLK1 and CLK2 based on a result of counting a high level period of the first clock signal CLK1 using the count clock signal CCLK.

The clock generator 120 performs control so that the low level period of the first clock signal CLK1 becomes the same as the counted high level period, and increases the first clock signal CLK1 again at a time point at which the counted period lapses. The clock generator 120 may invert the first clock signal CLK1 to generate the second clock signal CLK2. Accordingly, the first and second clock signals CLK1 and CLK2 having the same cycle and opposite phases are generated. While a case in which the clock generator 120 generates the first clock signal CLK1 based on the half cycle signal HS has been described, the clock generator 120 may generate the second clock signal CLK2 based on the half cycle signal HS and invert the second clock signal CLK2 to generate the first clock signal CLK1.

The clock generator 120 subtracts a period according to the frequency shift signal FSS from the one of cycles of the first and second clock signals CLK1 and CLK2 in the cycle before the time point at which the abnormal event occurs, in each predetermined cycle unit, after the time point at which the abnormal event occurs.

For example, the clock generator 120 subtracts the first period based on the frequency shift signal FSS from the result of counting the cycle of the first clock signal CLK1 in an immediately previous cycle, sets the result of subtraction as a current cycle of the first clock signal CLK1, generates the first clock signal CLK1 based on the set current cycle, and inverts the first clock signal CLK1 to generate the second clock signal CLK2.

The clock generator 120 enables the reset signal RS in synchronization with a rising edge of the second clock signal CLK2, and disables the reset signal RS in synchronization with a rising edge of the first clock signal CLK1. When the clock generator 120 generates the second clock signal CLK2 and then inverts the second clock signal CLK2 to generate the first clock signal CLK1, the clock generator 120 may enable the reset signal RS in synchronization with the rising edge of the first clock signal CLK1 and disable the reset signal RS in synchronization with the rising edge of the second clock signal CLK2.

The primary side driving controller 130 receives the first and second clock signals CLK1 and CLK2 and the dead time information DT, and generates the first and second driving control signals PDRV1 and PDRV2. For example, the primary side driving controller 130 generates the first driving control signal PDRV1 enabled at a time point delayed by the dead time according to the dead time information DT from the rising edge of the first clock signal CLK1 and disabled at a falling edge of the first clock signal CLK1, and generates the second driving control signal PDRV2 enabled at a time point delayed by the dead time from the rising edge of the second clock signal CLK2 and disabled at the falling edge of the second clock signal CLK2.

The primary side driver 300 generates the first and second driving voltages PRDRV1 and PRDRV2 at a level at which the first and second switches Q1 and Q2 can be driven based on the first and second driving control signals PDRV1 and PDRV2. For example, the primary side driver 300 generates the first driving voltage PRDRV1 enabled during an enable period of the first driving control signal PDRV1 and generates the second driving voltage PRDRV2 enabled during the enable period of the second driving control signal PDRV2.

Hereinafter, an operation of the switch control circuit 10 will be described with reference to FIGS. 3A to 3C.

Figure 3A:
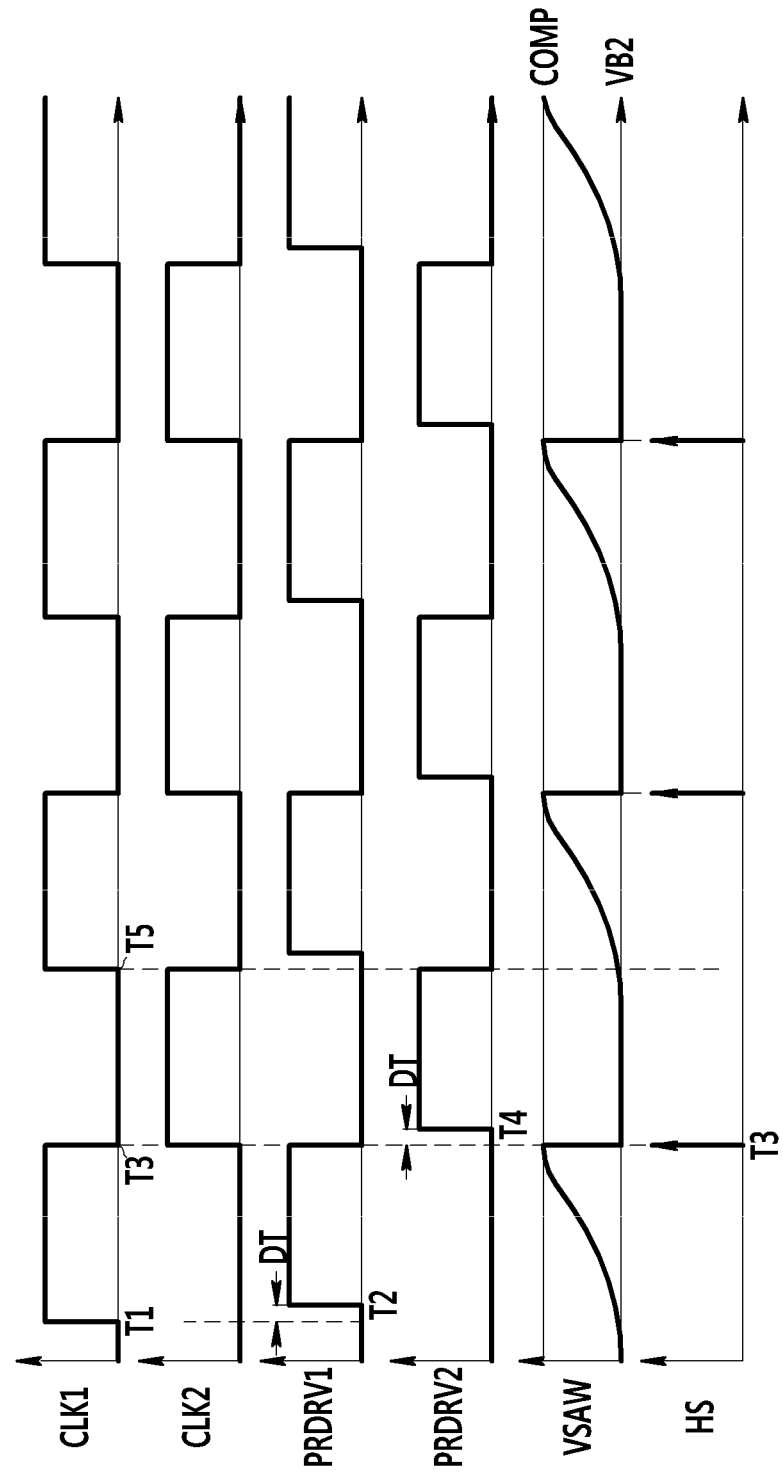
FIG. 3A is a waveform diagram illustrating first and second clock signals, first and second driving control signals, a saw wave, and a half cycle signal in a normal state.

FIG. 3A is a waveform diagram illustrating the first and second clock signals, the first and second driving control signals, the saw wave, and the half cycle signal in the normal state.

Figure 3B:
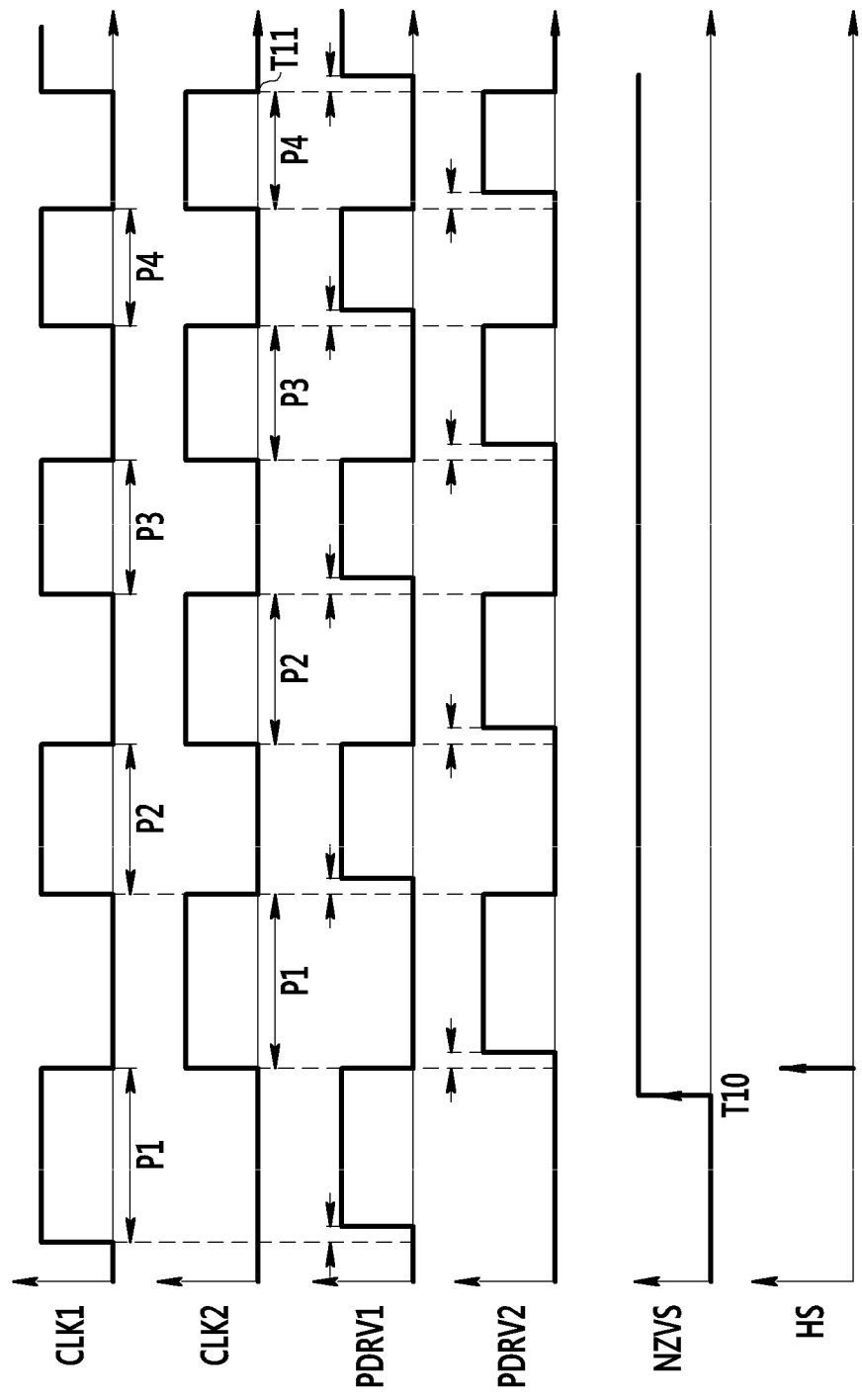
FIG. 3B is a waveform diagram illustrating first and second clock signals, first and second driving control signals, a non-zero voltage switching signal, and a half cycle signal in a period including a time point at which an abnormal event occurs.

FIG. 3B is a waveform diagram illustrating the first and second clock signals, the first and second driving control signals, the non-zero voltage switching signal NZVS, and the half cycle signal in a period including the time point at which the abnormal event occurs.

Figure 3C:
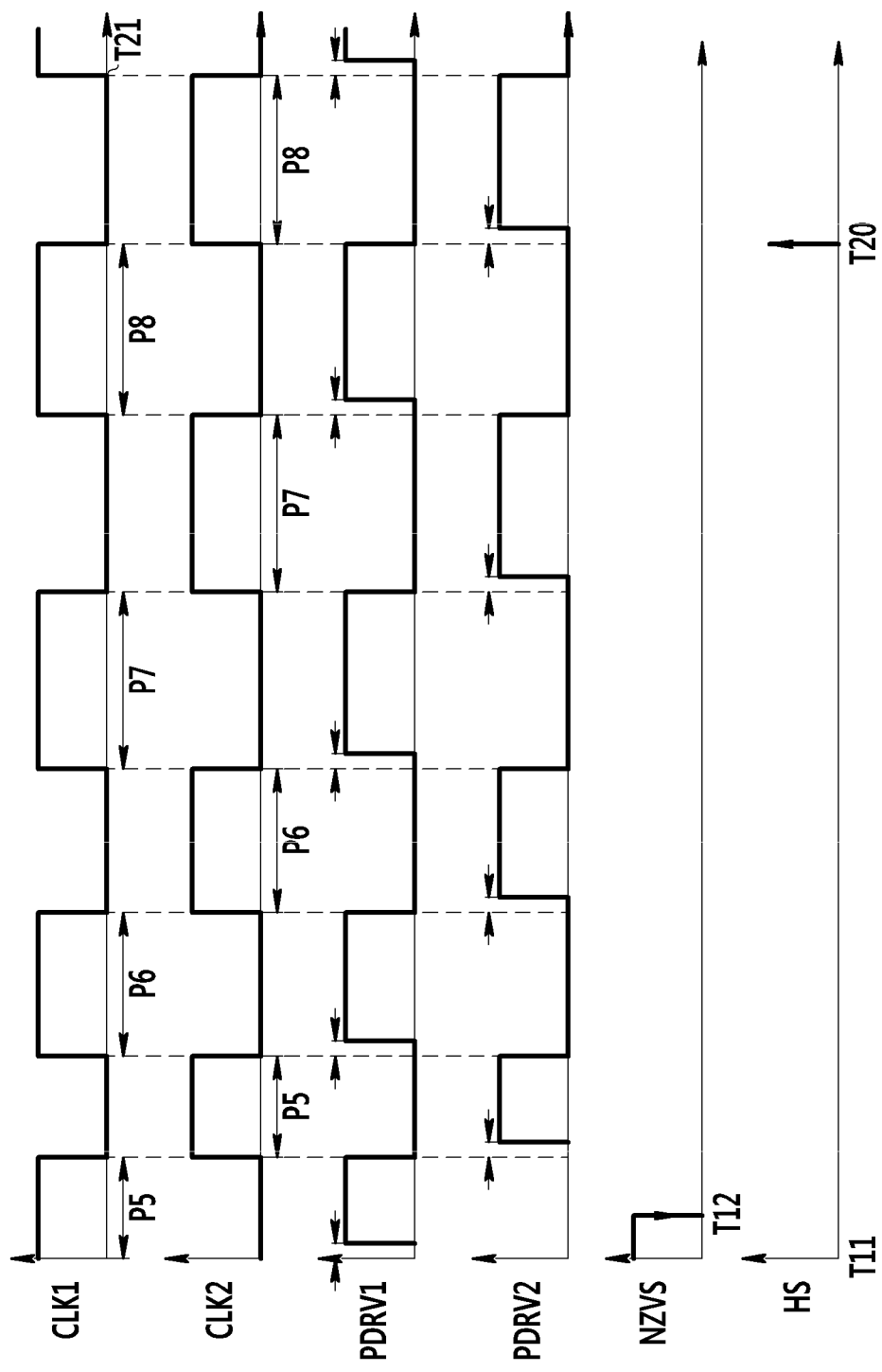
FIG. 3C is a waveform diagram illustrating the first and second clock signals, the first and second driving control signals, the non-zero voltage switching signal, and the half cycle signal in a period including a time point at which the abnormal event ends.

FIG. 3C is a waveform diagram illustrating the first and second clock signals, the first and second driving control signals, the non-zero voltage switching signal NZVS, and the half cycle signal in a period including the time point at which the abnormal event ends.

As illustrated in FIG. 3A, the first clock signal CLK1 rises at a time point T1, and the first driving control signal PDRV1 rises at a time point T2 delayed by a dead time DT from the time point T1. The first switch Q1 is turned ON at the time point T2, and the current detection voltage VICS begins to be generated. Accordingly, the voltage VCT and the current detection voltage VICS are added, and the saw wave VSAW rises.

The rising saw wave VSAW arrives at the comparison voltage COMP at a time point T3. At this time, the half cycle signal HS is generated. Accordingly, at the time point T3, the first clock signal CLK1 falls, and the second clock signal CLK2 rises. The second driving control signal PDRV2 rises at a time point T4 delayed by the dead time DT from the time point T3. The first switch Q1 is turned OFF at the time point T3, and the second switch Q2 is turned ON at the time point T4. After the time point at which the first switch Q1 is turned OFF, the current detection voltage VICS is not generated, and the saw wave VSAW is maintained at a voltage VB2.

The clock generator 120 counts an enable period T1-T3 of the first clock signal CLK1 using a count clock signal CCLK, and increases the first clock signal CLK1 to a high level at a time point T5 at which the period T1-T3 lapses from the time point T3. Since the second clock signal CLK2 is a signal obtained by inverting the first clock signal CLK1, the second clock signal CLK2 falls to a low level at the time point T5.

It is assumed that non-zero voltage switching that is a type of abnormal event occurs at a time point T10, as illustrated in FIG. 3B.

The clock generator 120 counts an enable period P1 of the first clock signal CLK1 using a count clock signal CCLK. The clock generator 120 generates the first clock signal CLK1 having a cycle obtained by subtracting a period corresponding to the first shift unit from a cycle of the first clock signal CLK1 according to the result of counting, and generates the second clock signal CLK2 by inverting the first clock signal CLK1.

Accordingly, the frequencies of the first and second clock signals CLK1 and CLK2 increase, and the enable periods of the first and second clock signals CLK1 and CLK2 decrease to P2. That is, the ON time of the first and second switches Q1 and Q2 decreases.

Next, the clock generator 120 counts the enable period P2 of the first clock signal CLK1 using the count clock signal CCLK. The clock generator 120 generates the first clock signal CLK1 having a cycle obtained by subtracting the period corresponding to the first shift unit from the cycle of the first clock signal CLK1 according to the result of counting, and generates the second clock signal CLK2 by inverting the first clock signal CLK1.

Then, the frequencies of the first and second clock signals CLK1 and CLK2 increase, and the enable periods of the first and second clock signals CLK1 and CLK2 decrease to P3. That is, the ON time of the first and second switches Q1 and Q2 decreases.

Similarly, the frequencies of the first and second clock signals CLK1 and CLK2 increase, the enable period decreases to P4, and the ON time of the first and second switches Q1 and Q2 decreases.

The frequencies of the first and second clock signals CLK1 and CLK2 increase during a predetermined monitoring period, as described above. If the abnormal event does not end during the monitoring period, the switch control circuit 10 starts up the protection operation at a time point at which the monitoring period lapses.

It is assumed that the non-zero voltage switching signal NZVS is disabled, that is, the abnormal event ends, at a time point T12 in the monitoring period, as illustrated in FIG. 3C.

An operation after a time point at which the abnormal event ends following a time point T11 of FIG. 3B will be described with reference to FIG. 3C.

The enable period decreases to P5 as the frequencies of the first and second clock signals CLK1 and CLK2 increase. Following the time point T12, the clock generator 120 restores the frequencies of the first and second clock signals CLK1 and CLK2.

This scheme is the same as the frequency increase scheme described above. The clock generator 120 counts the enable period P5 of the first clock signal CLK1 using the count clock signal CCLK. The clock generator 120 generates the first clock signal CLK1 having a cycle increased by a period corresponding to a predetermined shift unit from the cycle of the first clock signal CLK1 according to the result of counting, and generates the second clock signal CLK2 by inverting the first clock signal CLK1.

Accordingly, the frequencies of the first and second clock signals CLK1 and CLK2 decrease, and the enable periods of the first and second clock signals CLK1 and CLK2 increase to P6. That is, the ON time of the first and second switches Q1 and Q2 increases.

Similarly, the enable periods of the first and second clock signals CLK1 and CLK2 increase to P7, and the ON time of the first and second switches Q1 and Q2 increases, as illustrated in FIG. 3C.

The current detection voltage VICS rises, and the saw wave VSAW arrives at the comparison voltage at a time point T20. Accordingly, the half cycle signal HS is generated at the time point T20, and the frequencies of the first and second clock signals CLK1 and CLK2 can be controlled based on the half cycle signal HS after the time point T20.

That is, the first clock signal CLK1 rises at the time point T21 at which a period P8 lapses from a time point T20, and the second clock signal CLK2 rises at the time point T20 and falls at the time point T21.

The difference between the period P2 and the period P3 may be set to be greater than the difference between the period P5 and the period P6. Further, while the case in which the clock generator 120 counts the enable period of the first clock signal CLK1 has been described, the invention is not limited thereto, and any one of the disable period of the first clock signal CLK1, the enable period of the second clock signal CLK2, and the disable period of the second clock signal CLK2 may be counted. In addition, while the frequency increase and decrease operation is performed in a unit of one cycle of the first and second clock signals CLK1 and CLK2, the invention is not limited thereto, and the operation may be performed in units of at least 2 cycles. Further, the number of cycles in which the frequency increase and decrease operation is performed may be changed every time.

Hereinafter, a frequency shift controller according to another embodiment of the invention will be described.

Figure 4:
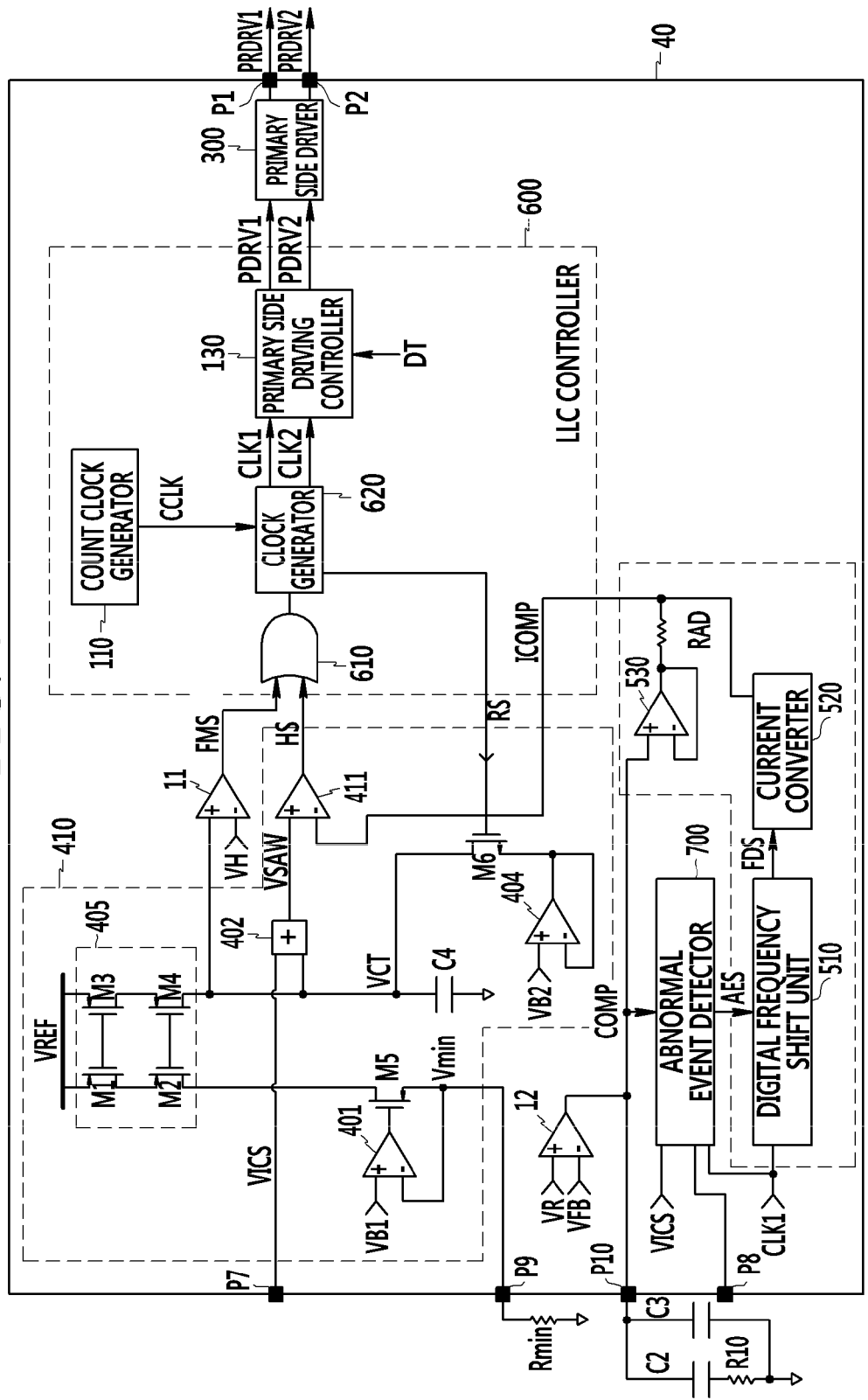
FIG. 4 is a diagram illustrating a switch control circuit including a frequency shift controller according to another embodiment.

FIG. 4 is a diagram illustrating a switch control circuit including a frequency shift controller according to another embodiment.

The same components as those in FIG. 1 are denoted with the same reference signs, and repeated descriptions will be omitted.

As illustrated in FIG. 4, a frequency shift controller 500 changes a comparison voltage COMP without generating a frequency control signal FSS when an abnormal event is detected, unlike the embodiment illustrated in FIG. 1. The comparison voltage COMP is generated by the error amplifier 12 and the compensator.

In the previous embodiment, when the abnormal event is detected, a predetermined period corresponding to the frequency control signal FSS is subtracted from the immediately previous cycle calculated based on the result of counting the enable period of the first and second clock signals CLK1 and CLK2 immediately before the time point at which the abnormal event is detected, so that the frequency is increased, regardless of the generation of the half cycle signal HS. Also, after the time point at which the abnormal event ends, the predetermined period corresponding to the frequency control signal FSS is added to the immediately previous cycle calculated in the same way until the half cycle signal HS is generated, so that the frequency is decreased.

In other embodiments, the frequency control signal FSS is not used. After a time point at which the abnormal event is detected, the comparison voltage COMP is decreased so that the frequency is increased, and after the time point at which the abnormal event ends, the comparison voltage COMP is increased so that the frequency is decreased.

As illustrated in FIG. 4, the switch control circuit 40 includes a half cycle signal generator 410, a frequency shift controller 500, an LLC controller 600, and an abnormal event detector 700. The switch control circuit 10 according to the embodiment illustrated in FIG. 1 may further include the abnormal event detector 700.

The abnormal event detector 700 may detect non-zero voltage switching and current limiting conditions using the detection voltage VCS, the comparison voltage COMP, and the current detection voltage VICS to generate an abnormal event signal AES. The abnormal event detector 700 may further receive the first clock signal CLK1 so as to detect the abnormal event in synchronization with the switching operation of the first and second switches Q1 and Q2. The other embodiment is not limited thereto, and the abnormal event detector 700 may receive the second clock signal CLK2 to detect the abnormal event in synchronization with the switching operation.

Hereinafter, the abnormal event detector 700 will be described with reference to FIG. 5.

Figure 5:
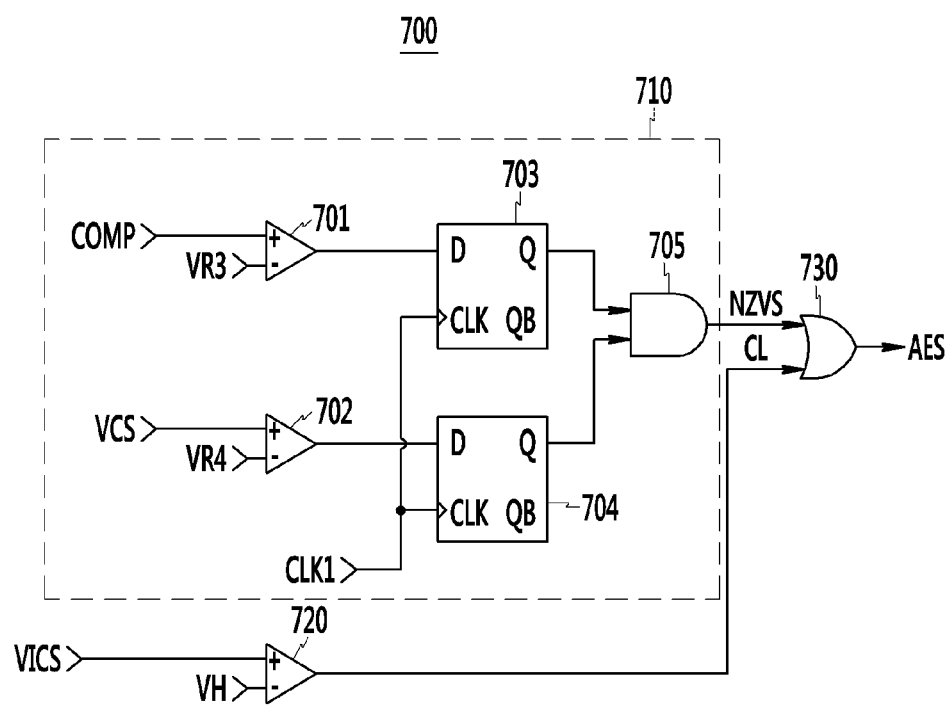
FIG. 5 is a diagram illustrating an abnormal event detector.

FIG. 5 is a diagram illustrating the abnormal event detector.

The abnormal event detector 700 may include a non-zero voltage switching detection unit 710, a current limiting condition comparator 720, and a logic gate 730, as illustrated in FIG. 5.

The non-zero voltage switching detection unit 710 includes two comparators 701 and 702, two D flip flops 703 and 704, and an AND gate 705. The comparator 701 outputs a result of comparing the comparison voltage COMP with a reference voltage VR3, and the comparator 702 outputs a result of comparing the detection voltage VCS with a reference voltage VR4. The D flip flop 703 outputs an input of an input terminal D, that is, an output of the comparator 701 via an output terminal Q in synchronization with a rising edge of the first clock signal CLK1 input to a clock terminal CLK, and the D flip flop 704 outputs an input of an input terminal D, that is, an output of the comparator 702 via an output terminal Q in synchronization with a rising edge of the first clock signal CLK1 input to a clock terminal CLK. The AND gate 705 performs an AND operation of the outputs of the D flip flop 703 and the D flip flop 704 to generate the non-zero voltage switching signal NZVS.

The reference voltage VR3 is input to an inversion terminal (−) of the comparator 701, and the comparison voltage COMP is input to a non-inversion terminal (+). The reference voltage VR4 is input to an inversion terminal (−) of the comparator 702, and the detection voltage VCS is input to a non-inversion terminal (+). When the input of the non-inversion terminal (+) is equal to or greater than the input of the inversion terminal (−), the comparator 701 and the comparator 702 output a high level and, otherwise, output a low level.

Accordingly, when the comparison voltage COMP is equal to or greater than the reference voltage VR3 and the detection voltage VCS is smaller than the reference voltage VR4, the outputs of the D flip flop 703 and the D flip flop 704 reach a high level at the rising edge of the first clock signal CLK1, and the non-zero voltage switching signal NZVS which is the output of AND gate 705 increases to the high level. When the comparison voltage COMP is smaller than the reference voltage VR3 or the detection voltage VCS is equal to or greater than the reference voltage VR4, the non-zero voltage switching signal NZVS is at a low level.

Thus, when non-zero voltage switching occurs, the non-zero voltage switching signal NZVS increases to the high level.

A threshold voltage VH is input to an inversion terminal (−) of the current limiting condition comparator 720, and the current detection voltage VICS is input to a non-inversion terminal (+) of the current limiting condition comparator 720. When the input of the non-inversion terminal (+) is equal to or greater than the input of the inversion terminal (−), the current limiting condition comparator 720 outputs a current limiting signal CL at a high level and, otherwise, outputs the current limiting signal CL at a low level.

The current supplied to the load connected to the resonant converter 1 being equal to or greater than the threshold can correspond to the current limiting conditions. The current detection voltage VICS is a result of integrating a current flowing through the primary side, and indicates power supplied to the secondary side. Therefore, the current detection voltage VICS being equal to or greater than the threshold voltage VH corresponding to a predetermined threshold value corresponds to the current limiting conditions that are the abnormal event.

The logic gate 730 performs a logic operation of the non-zero voltage switching signal NZVS and the current limiting signal CL to generate an abnormal event signal AES. In the embodiment illustrated in FIG. 4, the logic gate is implemented as an OR gate that performs an OR operation. Therefore, when any one of the two inputs NZVS and CL is at a high level, the logic gate 730 generates an abnormal event signal AES at a high level.

The frequency shift controller 500 increases the frequencies of the first and second clock signals CLK1 and CLK2 so as to decrease the ON time of the first and second switches Q1 and Q2 when the abnormal event is detected by the abnormal event detector 700, and decreases the frequencies of the first and second clock signals CLK1 and CLK2 when the abnormal event ends during a predetermined monitoring period. The frequency shift controller 500 receives the comparison voltage COMP, gradually decreases the comparison voltage COMP for increase in the frequencies of the first and second clock signals CLK1 and CLK2, and gradually increases the comparison voltage COMP for decrease in the frequencies of the first and second clock signals CLK1 and CLK2.

The digital frequency shift unit 510 generates a frequency digital shift signal FDS for increasing the frequencies of the first and second clock signals CLK1 and CLK2 by a shift unit in each predetermined period until the abnormal event signal AES decreases from a high level to a low level. After a time point at which the abnormal event signal AES decreases to a low level, the digital frequency shift unit 510 generates a frequency digital shift signal FDS for decreasing the frequencies of the first and second clock signals CLK1 and CLK2 by a predetermined shift unit in each predetermined period.

Hereinafter, the digital frequency shift unit 510 will be described with reference to FIG. 6.

Figure 6:
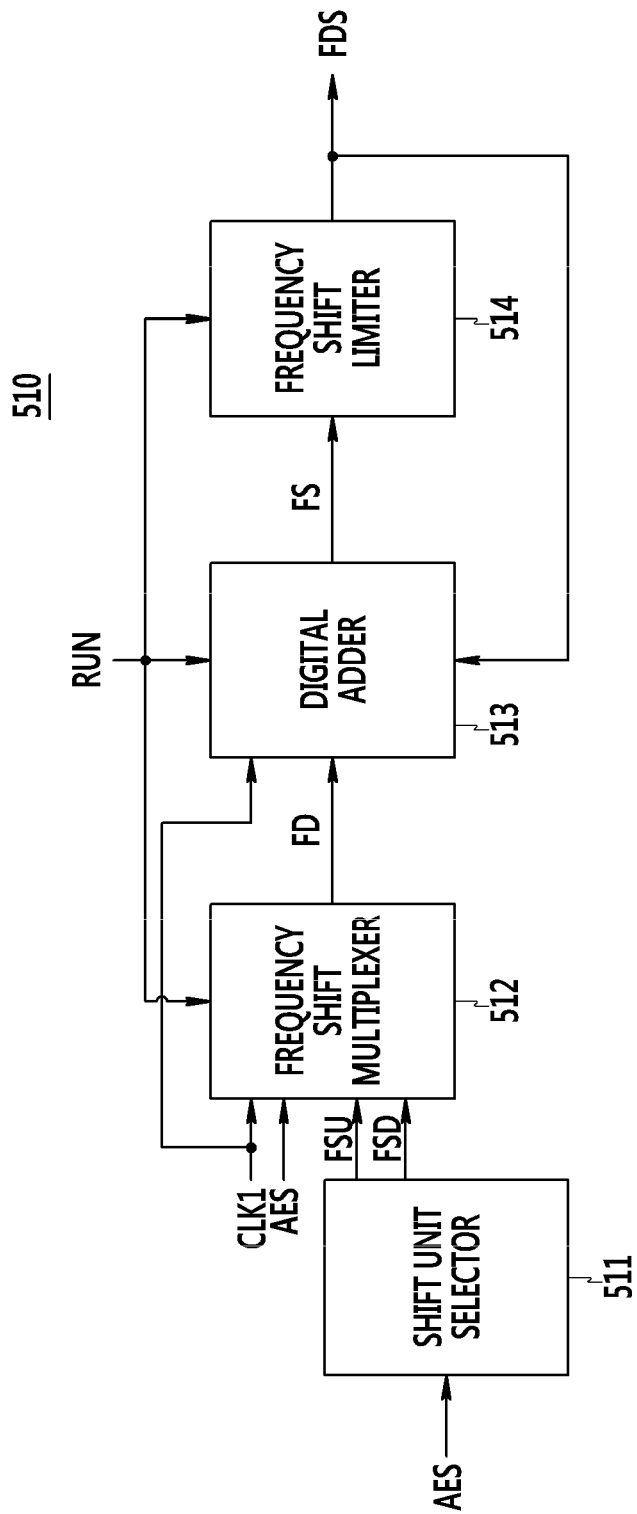
FIG. 6 is a diagram illustrating a digital frequency shift unit.

FIG. 6 is a diagram illustrating the digital frequency shift unit.

The digital frequency shift unit 510 includes a shift unit selector 511, a frequency shift multiplexer 512, a digital adder 513, and a frequency shift limiter 514, as illustrated in FIG. 6.

The shift unit selector 511 selects a shift unit FSU for frequency increase and a shift unit FSD for frequency decrease based on the abnormal event signal AES, and outputs the shift unit FSU. For example, the shift unit selector 511 selects the shift unit FSU for frequency increase and outputs the shift unit FSU for frequency increase from a time point at which the abnormal event signal AES rises to a high level, and selects the shift unit FSD for frequency decrease and outputs the shift unit FSU for frequency decrease from a time point at which the abnormal event signal AES at the high level falls to a low level. The shift unit FSD for frequency increase and the shift unit FSU for frequency decrease may be different from each other.

In addition, the shift unit FSD for frequency increase and the shift unit FSU for frequency decrease may be differently set according to a type of the abnormal event. In this case, the non-zero voltage switching signal NZVS and the current limiting signal CL may be input to the shift unit selector 511 together with the abnormal event signal AES. The frequency shift multiplexer 512 outputs the shift unit FSU for frequency increase as a frequency change amount FD in synchronization with the first clock signal CLK1 during a high level period of the abnormal event signal AES, and outputs the shift unit FSD for frequency decrease as the frequency change amount FD in synchronization with the first clock signal CLK1 after a time point at which the abnormal event signal AES is changed from the high level to the low level.

The digital frequency shift unit 510 can enable a RUN signal from a time point at which the abnormal event signal AES rises to a high level to a time point at which the frequency digital signal FDS decreases to an initial value (for example, "0"). The frequency shift multiplexer 512, the digital adder 513, and the frequency shift limiter 514 can operate during an enable period of the RUN signal. Further, the digital frequency shift unit 510 increases the frequency only from a time point at which the abnormal event signal AES rises to the high level to a time point at which a predetermined monitoring period lapses. If the monitoring period lapses even when the abnormal event signal AES is at the high level, the abnormal state may be determined, and the protection operation may be started up.

The digital adder 513 adds the frequency change amount FD to the frequency digital shift signal FDS to determine an amount of frequency shift, and generates a frequency shift signal FS according to the determined amount of frequency shift. The frequency shift limiter 514 selects one of a lowest frequency shift signal and a highest frequency shift signal and outputs the selected frequency shift signal as the frequency digital shift signal FDS when the frequency shift signal FS is out of a predetermined range, and outputs the frequency shift signal FS as the frequency digital shift signal FDS when the frequency shift signal FS is not out of the predetermined range.

In the digital frequency shift unit 510, the frequency shift unit FSU for increase, the frequency shift unit FSD for decrease, the frequency change amount FD, the frequency shift signal FS, and the frequency digital shift signal FDS may be digital signals of a predetermined number o
f bits.

Referring back to FIG. 4, the current converter 520 generates and sinks a current according to the frequency digital shift signal FDS. For example, when the frequency digital shift signal FDS is a minimum value, the current converter 520 does not generate the current, and when the frequency digital shift signal FDS is a maximum value, the current converter 520 generates and sinks a highest current.

The error amplifier 530 receives and outputs the comparison voltage COMP. An inversion terminal (−) and an output terminal of the error amplifier 530 are connected to each other, and the comparison voltage COMP is input to a non-inversion terminal (+) of the error amplifier 530. Accordingly, the error amplifier 530 outputs the input like a buffer.

The comparison voltage COMP is connected to an inversion terminal (−) of the comparator 411 via a resistor RAD connected to the output terminal of the error amplifier 530. Since a current does not flow in the inversion terminal (−) of the comparator 411, the current sunk by the current converter 520 flows to the current converter 520 through the resistor RAD. Accordingly, the comparison voltage COMP is reduced by a voltage across the resistor RAD and supplied to the inversion terminal (−) of the comparator 411. Hereinafter, the voltage input to the inversion terminal (−) of the comparator 411 is referred to as an internal comparison voltage ICOMP.

In the normal state, the comparison voltage COMP is equal to the internal comparison voltage ICOMP, but the internal comparison voltage ICOMP gradually decreases from a time point at which the abnormal event occurs. The internal comparison voltage ICOMP increases from a time point at which the abnormal event ends, and becomes equal to the comparison voltage COMP again.

The comparator 411 generates the half cycle signal HS based on a result of comparing the saw wave VSAW with the internal comparison voltage ICOMP.

The LLC controller 600 further includes an OR gate 610. The OR gate 610 perform an OR operation of the output of the upper limit comparator 11 and the half cycle signal HS and outputs a result of the operation.

The clock generator 620 generates the first and second clock signals CLK1 and CLK2 based on the output of the OR gate 610. When the frequencies of the first and second clock signals CLK1 and CLK2 are not limited by the output of the upper limit comparator 11, the output of the OR gate 610 is determined based on the half cycle signal HS, and thus the clock generator 620 generates the first and second clock signals CLK1 and CLK2 based on the half cycle signal HS.

The clock generator 620 counts cycles of the output of the OR gate 610 using the count clock signal CCLK and generates the first and second clock signals CLK1 and CLK2 having the counted cycle. The clock generator 620 generates any one of the first and second clock signals CLK1 and CLK2 based on the cycle of the output of the OR gate 610, and inverts the generated clock signal to generate the other clock signal. Then, the first and second clock signals CLK1 and CLK2 having the same cycle and opposite phases are generated.

An operation of another embodiment when the abnormal event occurs will be described with reference to FIG. 7.

Figure 7:
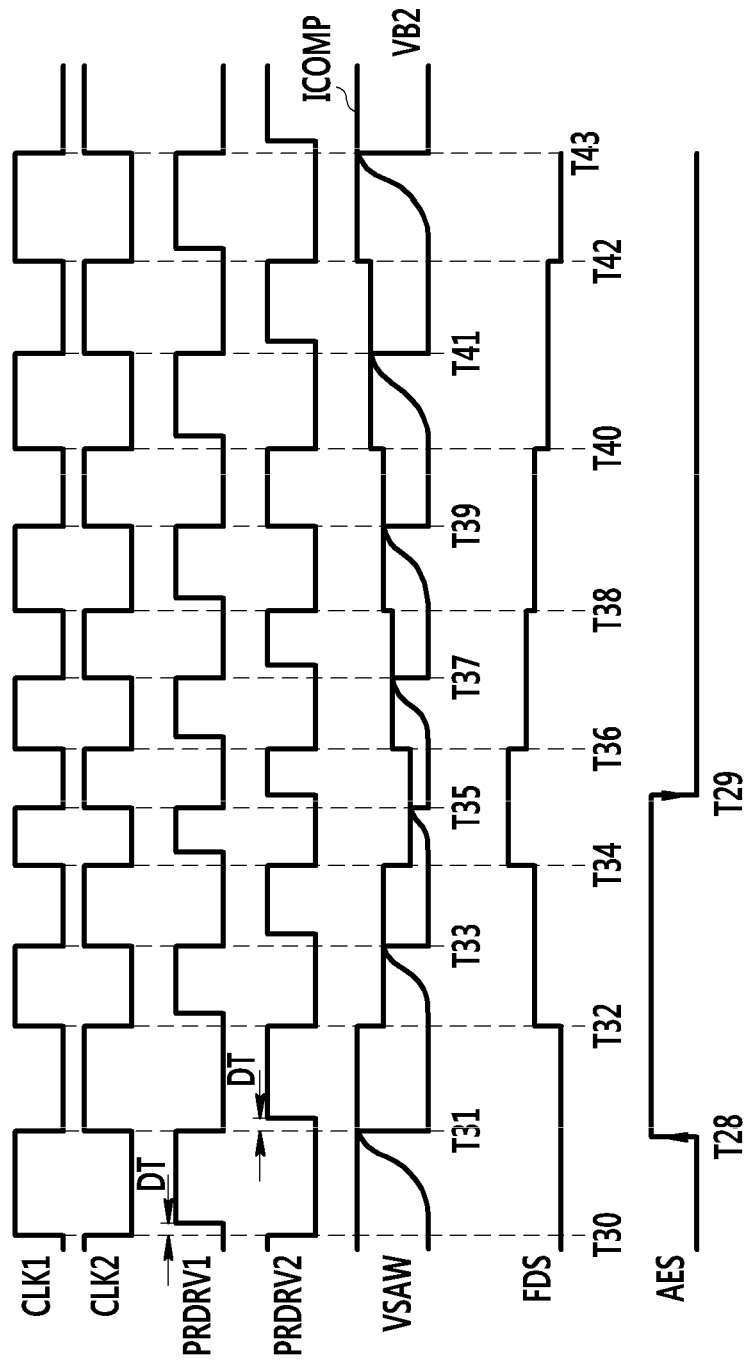
FIG. 7 is a waveform diagram illustrating first and second clock signals, a comparison voltage, an internal comparison voltage, a saw wave, and frequency digital shift signal according to another embodiment.

FIG. 7 is a waveform diagram illustrating first and second clock signals, a comparison voltage, an internal comparison voltage, a saw wave, and a frequency digital shift signal according to another embodiment.

The first clock signal CLK1 rises at a time point T30, and a first driving voltage PRDRV1 rises and the first switch Q1 is turned ON at a time point at which a dead time DT lapses from the time point T30. The first switch Q1 is turned ON, and the saw wave VSAW begins to increase, and arrives at the internal comparison voltage ICOMP at a time point T31. At the time point T31, the first clock signal CLK1 falls and the second clock signal CLK2 rises. At the time point T31, the first driving voltage PRDRV1 falls, and the first switch Q1 is turned OFF. At a time point at which the dead time DT lapses from the time point T31, a second driving voltage PRDRV2 rises, and the second switch Q2 is turned ON.

At a time point T28, the abnormal event occurs, and the abnormal event signal AES rises. Accordingly, the frequency digital shift signal FDS increases from T32 that is a rising time point of the first clock signal CLK1, and the internal comparison voltage ICOMP decreases according to the frequency digital shift signal FDS.

The saw wave VSAW arrives at the internal comparison voltage ICOMP at a time point T33. At the time point T33, the first clock signal CLK1 falls, and the second clock signal CLK2 rises. At a time point T34, the frequency digital shift signal FDS increases, and the internal comparison voltage ICOMP decreases according to the frequency digital shift signal FDS. At a time point T35, the saw wave VSAW arrives at the internal comparison voltage ICOMP, the first clock signal CLK1 falls, and the second clock signal CLK2 rises.

Thus, when the abnormal event occurs, the internal comparison voltage ICOMP gradually decreases, the frequencies of the first and second clock signals CLK1 and CLK2 increase, and the ON time of the first and second switches Q1 and Q2 decreases.

At a time point T29, the abnormal event ends, and the abnormal event signal AES falls. Accordingly, the frequency digital shift signal FDS decreases from T36 that is a rising time point of the first clock signal CLK1, and the internal comparison voltage ICOMP increases according to the frequency digital shift signal FDS.

At a time point T37, the saw wave VSAW arrives at the internal comparison voltage ICOMP, the first clock signal CLK1 falls, and the second clock signal CLK2 rises. At a time point T38, the frequency digital shift signal FDS decreases, and the internal comparison voltage ICOMP increases according to the frequency digital shift signal FDS.

At a time point T39, the saw wave VSAW arrives at the internal comparison voltage ICOMP, the first clock signal CLK1 falls, and the second clock signal CLK2 rises. At a time point T40, the frequency digital shift signal FDS decreases, and the internal comparison voltage ICOMP increases according to the frequency digital shift signal FDS.

At a time point T41, the saw wave VSAW arrives at the internal comparison voltage ICOMP. At a time point T42, the first clock signal CLK1 falls, and the second clock signal CLK2 rises. At a time point T42, the frequency digital shift signal FDS decreases, and the internal comparison voltage ICOMP increases according to the frequency digital shift signal FDS.

At a time point T43, the saw wave VSAW arrives at the internal comparison voltage ICOMP, the first clock signal CLK1 falls, and the second clock signal CLK2 rises.

Thus, when the abnormal event ends, the internal comparison voltage ICOMP increases, the frequencies of the first and second clock signals CLK1 and CLK2 decrease, and the ON time of the first and second switches Q1 and Q2 increases.

A case in which the frequency digital shift signal FDS is changed in each cycle of the first clock signal CLK1 is shown in FIG. 7, but the invention is not limited thereto; the frequency digital shift signal FDS may be changed every two cycles. In addition, a case in which an amount of change in the frequency digital shift signal FDS when the frequency decreases is smaller than that when the frequency increases is shown in FIG. 7, but the invention is not limited thereto.

Thus, the resonant converter according to the embodiments increases the switching frequency to decrease the ON time when the abnormal event is detected, and increases the switching frequency when the abnormal event ends within the predetermined monitoring period. Accordingly, it is possible to prevent the resonant converter from being damaged due to the operation in the capacitor region.

While the embodiments have been described in detail, the scope of the invention is not limited thereto, and various variations and enhancements made by those skilled in the art using the basic concept of the invention defined in the claims are also within the scope of the invention.

DESCRIPTION OF SYMBOLS

1: resonant converter
Q1: first switch
Q2: second switch
20: transformer
30: gate driving circuit
SR1: first synchronization rectification switch
SR2: second synchronization rectification switch
10: switch control circuit
100, 600: LLC controller
200, 500: frequency shift controller
300: primary side driver
400, 410: half cycle signal generator
700: abnormal event detector
510: digital frequency shift unit
511: shift unit selector
512: frequency shift multiplexer
513: digital adder
514: frequency shift limiter

What is claimed is:

1. A resonant converter comprising:
a first switch;
a second switch coupled to the first switch;
a capacitor and an inductor electrically coupled to a node to which the first switch and the second switch are coupled; and
a switch control circuit configured to shift switching frequencies of the first and second switches during a period for which an abnormal event lasts when an occurrence of the abnormal event is detected, shift the switching frequency in an opposite direction when the abnormal event ends, control a switching operation of the first and second switches according to first and second clock signals, respectively, and increase frequencies of the first and second clock signals during the period for which the abnormal event lasts.

2. The resonant converter according to claim 1,
wherein the switch control circuit is configured to increase the frequencies of the first and second clock signals in a first period of at least one cycle of the first clock signal or the second clock signal.

3. The resonant converter according to claim 1,
wherein the switch control circuit is configured to decrease the frequencies of the first and second clock signals from a time point at which the abnormal event ends.

4. The resonant converter according to claim 1,
wherein the switch control circuit is configured to generate a comparison voltage corresponding to an output voltage of the resonant converter, generate an internal comparison voltage by decreasing the comparison voltage by a predetermined period unit during the period for which the abnormal event lasts and shift the switching frequencies of first and second switches using the internal comparison voltage.

5. The resonant converter according to claim 1,
wherein the switch control circuit is configured to shift the switching frequencies of the first and second switches during the period for which the abnormal event lasts in a predetermined monitoring period.

6. The resonant converter according to claim 2,
wherein the abnormal event includes at least one of non-zero voltage switching or current limiting conditions, and
the switch control circuit is configured to perform control so that units by which the frequency is increased for the first and second clock signals are different in each first period according to each of the at least one of non-zero voltage switching or the current limiting conditions.

7. The resonant converter according to claim 3,
wherein the switch control circuit is configured to decrease the frequencies of the first and second clock signals in a second period of at least one cycle of any one of the first clock signal and the second clock signal.

8. The resonant converter according to claim 4,
wherein the switch control circuit is configured to increase the internal comparison voltage by the predetermined period unit from a time point at which the abnormal event ends until the internal comparison voltage arrives at the comparison voltage.

9. The resonant converter according to claim 4,
wherein the switch control circuit is configured to generate first and second clock signals using a half cycle signal according to a result of comparing a saw wave based on a current detection voltage corresponding to a current supplied to a load with the internal comparison voltage, and control a switching operation of the first and second switches according to the first and second clock signals.

10. The resonant converter according to claim 7,
wherein the abnormal event includes at least one of non-zero voltage switching or current limiting conditions, and
the switch control circuit is configured to perform control so that units by which the frequency is decreased for the first and second clock signals are different in each second period according to the at least one of the non-zero voltage switching or the current limiting conditions.

11. The resonant converter according to claim 9,
wherein the switch control circuit is configured to increase the internal comparison voltage by a predetermined period unit from a time point at which the abnormal event ends until the internal comparison voltage arrives at the comparison voltage.

12. A switch control circuit of a resonant converter to supply power according to a switching operation of first and second switches, the switch control circuit comprising:
a frequency shift controller configured to generate a frequency shift signal for increasing frequencies of first and second clock signals during a period for which an abnormal event lasts, and generate a frequency shift signal for decreasing frequencies of first and second clock signals when the abnormal event ends; and
an LLC controller configured to increase the frequencies of the first and second clock signals according to the frequency shift signal during the period for which the abnormal event lasts, decrease the frequencies of the first and second clock signals according to the frequency shift signal after the abnormal event ends, and control the switching operation of the first and second switches according to the first and second clock signals.

13. The switch control circuit according to claim 12, wherein the frequency shift controller is configured to generate a frequency shift signal for increasing the frequencies of the first and second clock signals by a shift unit according to a type of abnormal event in every predetermined period during the period for which the abnormal event lasts.

14. The switch control circuit according to claim 12, wherein the LLC controller is configured to set a current cycle of the first and second clock signals by subtracting a first period according to the frequency shift signal from a result of counting the first or second clock signals in an immediately previous cycle during the period for which the abnormal event lasts.

15. The switch control circuit according to claim 12, wherein the LLC controller is configured to set a current cycle of the first and second clock signals by adding a second period according to the frequency shift signal to a result of counting any one of the first and second clock signals in an immediately previous cycle from a time point at which the abnormal event ends.

16. The switch control circuit according to claim 13, wherein the predetermined period includes at least one cycle in the first or second clock signals.

17. The switch control circuit according to claim 14, wherein the LLC controller is configured to count an enable period of any one of the first and second clock signals in the immediately previous cycle using a count clock signal, and calculate one cycle of the first and second clock signals based on the counted period.

18. A switch control circuit of a resonant converter to supply power according to a switching operation of first and second switches, the switch control circuit comprising:
a half cycle signal generator configured to generate a comparison voltage corresponding to an output voltage of the resonant converter, and generate a half cycle signal based on a result of comparing the comparison voltage with a saw wave based on a current detection voltage corresponding to a current supplied to a load;
a frequency shift controller configured to decrease the comparison voltage in every first predetermined period during a period for which an abnormal event lasts to generate an internal comparison voltage, and increase the internal comparison voltage in every second predetermined period until the internal comparison voltage arrives at the comparison voltage when the abnormal event ends; and
an LLC controller configured to generate first and second clock signals using the internal comparison voltage, and control a switching operation of the first and second switches according to the first and second clock signals.

19. The switch control circuit according to claim 18, wherein the frequency shift controller includes
an error amplifier including a first input terminal to which the comparison voltage is input, and a second input terminal coupled to an output terminal;
a resistor coupled to the output terminal of the error amplifier; and
a current converter that generates a current based on a frequency digital shift signal for controlling a degree of decrease and increase in the comparison voltage, and
wherein the generated current flows from the output terminal of the error amplifier through the resistor, the comparison voltage decreases, and the internal comparison voltage is generated.

20. The switch control circuit according to claim 19, wherein the frequency shift controller comprises:
a frequency shift multiplexer configured to output a shift unit for frequency increase as a frequency change amount in every first predetermined period during the period for which the abnormal event lasts, and output a shift unit for frequency decrease as the frequency change amount in every second predetermined period from a time point at which the abnormal event ends;
a digital adder configured to generate a frequency shift signal by adding the frequency change amount to the frequency digital shift signal; and
a frequency shift limiter configured to limit the frequency shift signal to be included in a predetermined range.

21. The switch control circuit according to claim 20, further comprising:
a shift unit selector configured to select the shift unit for frequency increase when the abnormal event occurs, and select the shift unit for frequency decrease when the abnormal event ends.

* * * * *